Patented July 21, 1925.

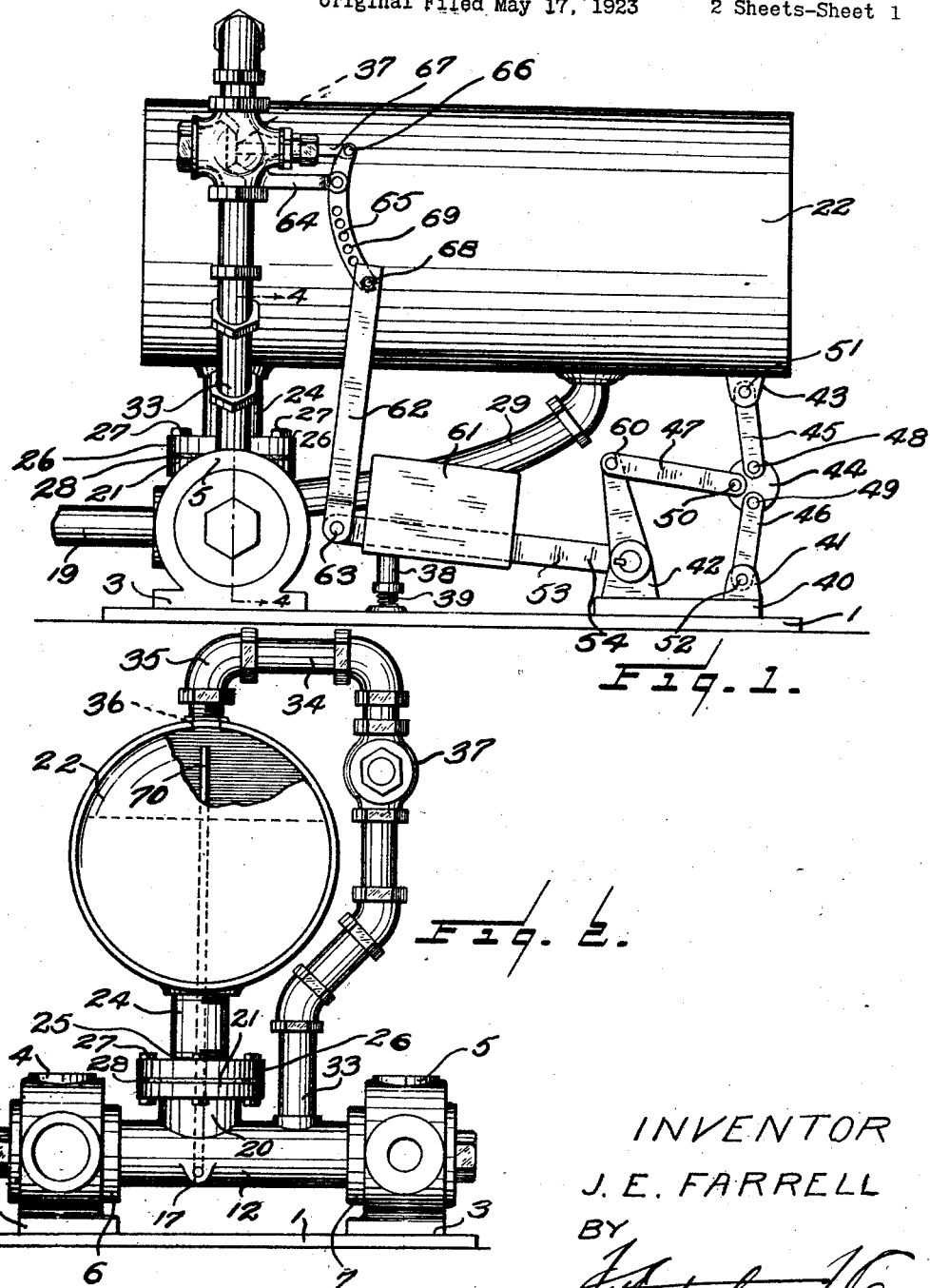

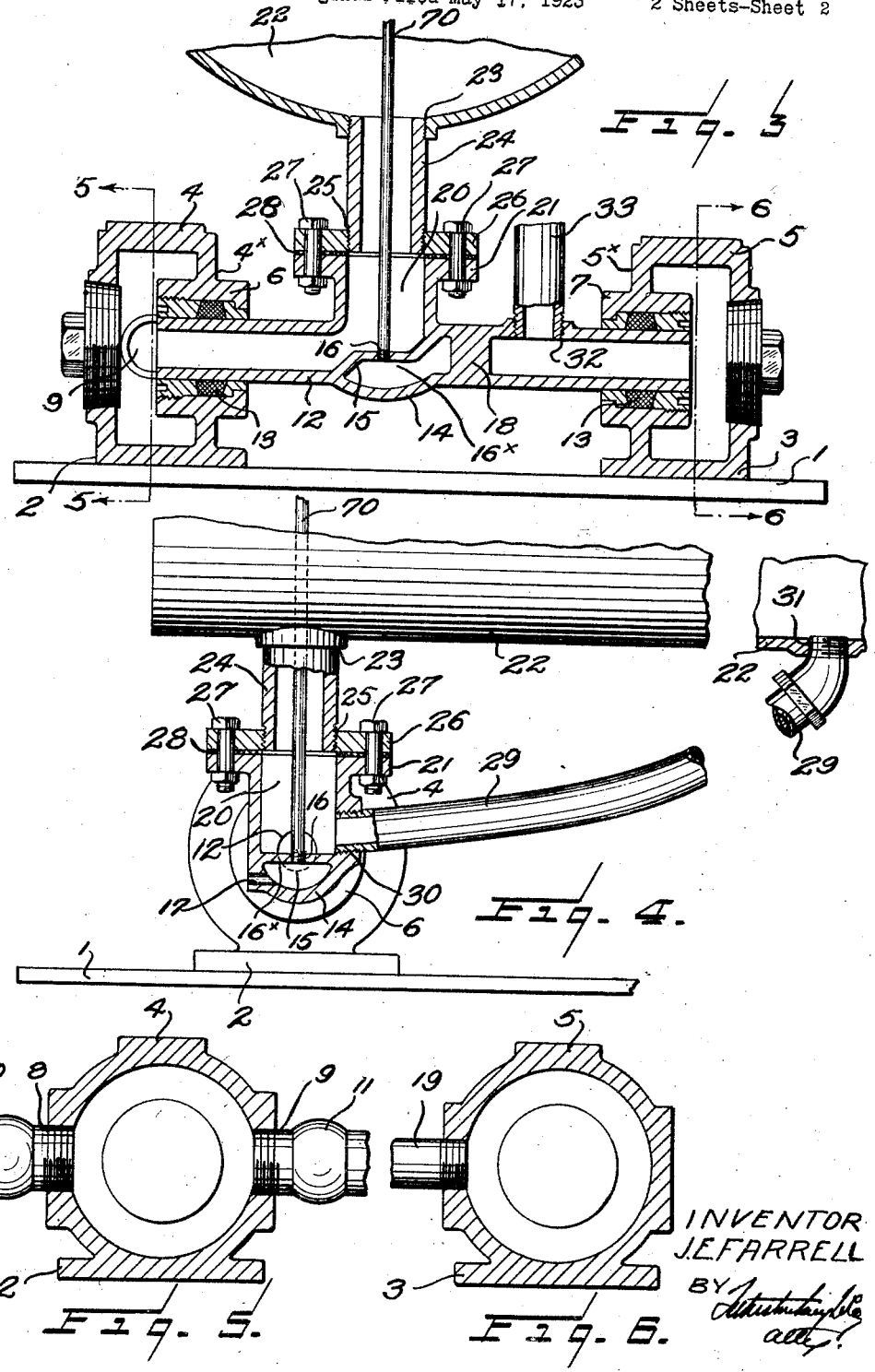

1,546,888

UNITED STATES PATENT OFFICE.

JOSEPH EDWARD FARRELL, OF TORONTO, ONTARIO, CANADA.

CONDENSATION RETURN TRAP FOR HEATING SYSTEMS.

Application filed May 17, 1923, Serial No. 639,648. Renewed January 22, 1925.

*To all whom it may concern:*

Be it known that I, JOSEPH EDWARD FARRELL, a subject of the King of Great Britain, and a resident of the city of Toronto, in the county of York, in the Province of Ontario, Canada, have invented certain new and useful Improvements in Condensation Return Traps for Heating Systems, of which the following is the specification.

My invention relates to improvements in condensation return traps for heating systems of the type employing a tilting tank and the object of the invention is to devise a condensation steam trap in which the steam inlet pipe admits the steam into the top of the tilting tank thereby preventing any danger of water being forced into the steam inlet pipe blocking the pipe so that it cannot be cleared by steam pressure in low pressure systems. Another object is to so construct the lever mechanism that the leverage will be shorter and therefore more sensitive in its operation and a still further object is to so construct the water inlet pipes that a large passage for the water will be provided and it consists essentially of the arrangement and construction of parts as hereinafter more particularly explained.

Fig. 1 is a side elevation of my return trap.

Fig. 2 is an end elevation.

Fig. 3 is a cross sectional view through the tilting support of the tank.

Fig. 4 is a sectional view on line 4—4, Fig. 3.

Fig. 5 is a sectional view on line 5—5, Fig. 3.

Fig. 6 is a sectional view on line 6—6, Fig. 3.

In the drawings like characters of reference indicate corresponding parts in each figure.

1 indicates a base plate upon which is supported a pair of oppositely disposed bearing members 2 and 3 provided with cylindrical bodies 4 and 5 upon the inner wall 4$^x$ and 5$^x$ of which are formed bearings 6 and 7. 8 is a water inlet pipe by which the condensations from the systems are conducted into the bearing body 4 and 9 is a pipe leading from the bearing body 4 preferably at a diametrically opposite point to the pipe 8 and leading to the boiler. The pipe 8 is provided with a non-return valve 10 and the pipe 9 with a non-return valve 11. 12 is a tubular rocking member supported in the bearings 6 and 7 by suitable glandular packings 13.

The tubular member 12 is provided intermediately of its length with an enlargement 14 across which extends in a diametrically disposed direction a cross wall 15 having an orifice 16 for a purpose which will hereinafter appear.

The space 16$^x$ below the wall 15 forms an air chamber which receives the air passing down from the top of the tank through the air pipe 70 so as to be discharged to the atmosphere through the orifice 17. 18 is a closure inserted in the tubular rocking member 12 between the cross wall 15 and the right hand end of such tubular member. 19 is a pipe leading into the cylindrical body 5 of the bearing 3 and by which the steam is supplied from the boiler. The enlarged portion 14 is provided with an upwardly extending tubular arm 20 provided at its upper end with an annular flange 21.

22 is my condensation tank which is provided in proximity to one end with an orifice 23. 24 is a depending pipe which is screwed or otherwise secured in the orifice 23 and is provided at its lower end with a threaded portion 25 around which is screwed an annular member 26, such member 26 being secured by bolts 27 through the flange 22. A suitable packing 28 is provided between the annular member 26 and flange 21. 29 is a tubular brace leading from an orifice 30 formed in the enlargement 14 above the wall 15.

The opposite end of the pipe extends through an orifice 31 formed in the condensation tank in proximity to its opposite end.

By this means it will be seen that the tank 22 is tiltably mounted upon the rocking member 12. 32 is an orifice formed in the tubular member 12 at the right hand side of the closure 18. 33 is a pipe extending upward from the orifice 32 and around the outside of the tank 22 and is provided at its upper end with an inturned portion 34 terminating in a depending portion 35 which is secured in an orifice 36. 37 is a valve located in the pipe 33 for controlling the passage of steam through such pipe, the steam being fed through the pipe 19 through the casing 5, tubular member 12 to the orifice 32 and from thence through the pipe 33 to the orifice 36 of the tank thereby feeding steam into the upper portion of the tank so as to exert a pressure upon the collected condensations contained in the tank.

38 is a depending stem carried preferably by the tubular brace 29 and provided at its lower end with a suitable spring buffer 39. 40 is a supplemental base plate provided with lugs 41 and 42. 43 is a lug depending from the free end of the tank 22. 44 is the circular link connector. 45, 46 and 47 are links pivotally mounted respectively at 48, 49 and 50 upon the member 44. The opposite end of the link 45 is pivotally connected at 51 to the lug 43. The opposite end of the link 46 is pivotally connected at 52 to the lug 41. 53 is a bell crank lever pivotally mounted at 54 upon the lug 42. The short arm of the bell crank 53 extends upward and slightly forward from its point of support and is pivotally connected at its upper end at 60 to the link 47.

The long arm of the bell crank 53 carries a weight 61 which is adjustably mounted thereon. 62 is a link pivotally connected at 63 to the outer end of the long arm of the bell crank 53. 64 is a standard extending horizontally outward from the casing of the valve 37. 65 is a curved link pivotally mounted intermediately of its length upon the standard 64 and pivotally connected at its upper end at 66 to the stem 67 of the valve 37.

The lower end of the link 65 is pivotally connected at 68 to the link 62. The link 65 may be provided with a series of perforations 69 so that the link 62 may be adjustably connected thereto. 70 is an air pipe which is secured at its lower end in the orifice 16 and extends vertically upward through the tubular arm 20 and pipe 24 into proximity to the top of the tank 22.

Having described the principal parts involved in my invention I will briefly describe the operation of the same.

The condensations and air from the system are carried into the cylindrical bearing body 4 by means of the pipe 8, the non-return valve 10 permitting its inflow but preventing its outflow. The condensations then pass into a tubular member 12 and up through the tubular arm 20 and pipe 24 into the tank 22. When the weight of the condensations collected in the tank 22 is sufficient such tank is tilted down at its free end against the action of the counterweight 61 which is thereby lifted. The same operation also raises the link 62 longitudinally upward tilting the lever 65 on its pivot and carrying the valve stem 67 to the open position thereby permitting the steam to pass through the valve 37, such steam passing through the pipe 19, the cylindrical bearing body 5, tubular stem 12, pipe 33 into the top of the tank 22.

When the steam pressure is sufficient the collected condensations in the tank are forced back through the pipe 24, tubular arm 20, tubular member 12 into the cylindrical body 4 and from thence are forced through the pipe 9 and non-return valve 11 to the boiler.

From this description it will be seen that I have devised a very simple construction of condensation return trap which will be simple and cheap to make and in which the steam pressure is exerted directly upon the surface of the water contained within the tank 22.

What I claim as my invention is:

1. In a condensation return trap for heating systems, a tilting tank having a steam inlet at the top, a rocking member carrying the tank and forming a water inlet and outlet and steam inlet and the centre of tilt of the tank, a rigid pipe connecting the steam inlet of the aforesaid rocking member to the steam inlet at the top of the tank, a valve located in the said rigid pipe above the water level in the tank, and means operated by the tilting movement of the tank for opening and closing the valve.

2. In a condensation return trap for heating systems, the combination with the tilting tank, a duct for conveying the condensations of the system into the lower portion of the tank, a steam inlet pipe for conveying the steam into the upper portion of the tank, and a controlling valve for such steam pipe, of a bell crank, a link connection between the short arm of the bell crank and the free end of the tank and also with the base, a counterweight for the long arm, and means operated by the movement of the long arm as the tank tilts for operating the controlling valve.

3. In a condensation return trap for heating systems, the combination with the tilting tank, a duct for conveying the condensations of the system into the lower portion of the tank, a steam inlet pipe for conveying the steam into the upper portion of the tank, a controlling valve for such steam pipe provided with a suitable stem, of a bell crank, a link connection between the short arm of the bell crank and the free end of the tank, a counterweight for the long arm, and a link and lever connection between the long arm of the bell crank and the valve stem adapted to open the valve by the upward movement of the bell crank lever and to close the valve by the downward movement.

4. In a condensation return trap for heating systems, the combination with the tilting tank provided with a water inlet in its lower peripheral portion and a steam inlet in its upper peripheral portion, of a bell crank pivotally mounted upon a suitable support, a link connector, a link between such connector and the free end of the tank, a link between such connector and the aforesaid suitable support, a link between the connector and the short arm of the bell crank, a valve controlling the steam inlet, and means operated by the movement of the long arm of the bell crank for operating such valve to the open and closed position.

JOSEPH EDWARD FARRELL.